FIG. 12
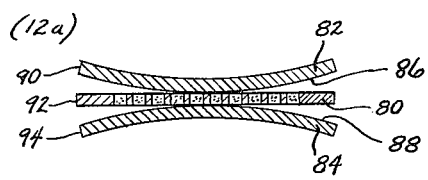
(12a)
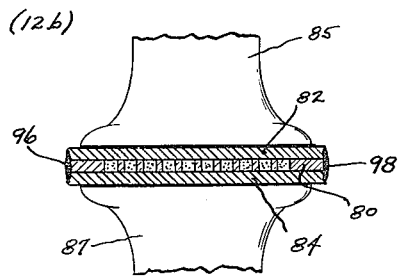
(12b)
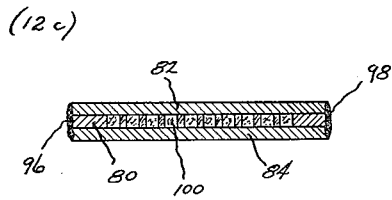
(12c)
FIG. 13.
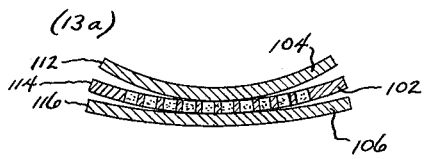
(13a)
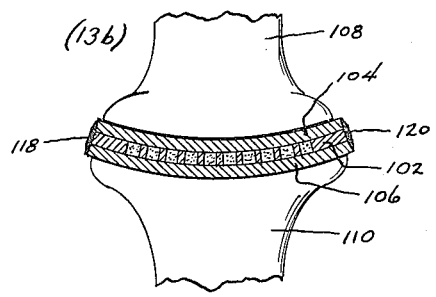
(13b)
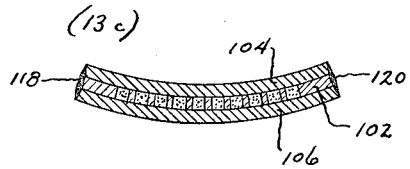
(13c)
CHAPMAN J. WALKER
INVENTOR.
BY
ATTORNEY.

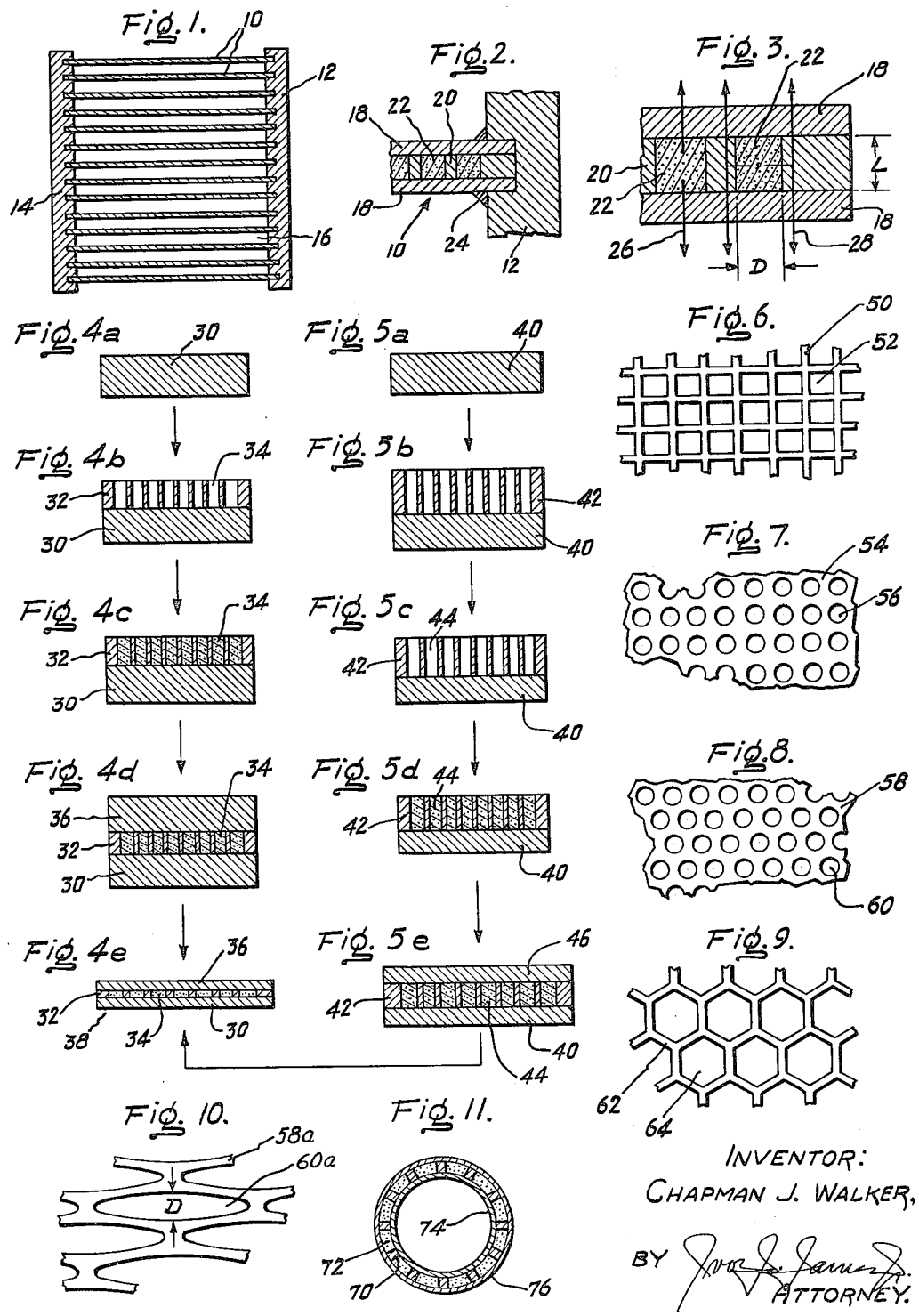

United States Patent Office 3,097,152
Patented July 9, 1963

3,097,152
NUCLEAR REACTOR FUEL ELEMENT AND METHOD FOR PRODUCING SUCH FUEL ELEMENT
Chapman J. Walker, Saddle River, N.J., assignor to General Electric Company, a corporation of New York
Filed Dec. 1, 1958, Ser. No. 777,488
6 Claims. (Cl. 204—154.2)

This invention relates broadly to the conversion of mass into energy through nuclear fission reactions and more specifically relates to an improved fuel element of substantially improved heat transfer characteristics for use in nuclear fission reactors, and to a method for producing such fuel.

The release of large amounts of energy through nuclear reactor fission reactions is now quite well known. In general, a fissionable atom such as $U^{233}$, $U^{235}$, or $Pu^{239}$ absorbs a neutron in its nucleus and undergoes a nuclear disintegration. This produces on the average, two fission products of lower atomic weight and great kinetic energy, and two or three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

The kinetic energy of the fission products is quickly dissipated in ambient material as heat. If after this heat generation there is at least one net neutron remaining which induces a subsequent fission, the fission reaction becomes self-sustaining and the heat generation is continuous. The heat is removed by recirculating a coolant through heat exchange relationship with the fissionable material and a heat sink. The reaction may continue as long as sufficient fissionable material remains in the system, considering the effects of the fission products which also may be present.

In order to maintain such fission reactions at a rate sufficient to generate usable quantities of thermal energy, nuclear reactors are presently being designed, constructed, and operated in which the fissionable material or nuclear fuel is contained in fuel elements which may have various shapes, such as plates, tubes, or rods. These fuel elements are usually provided with a corrosion resistant non-reactive cladding on their external surfaces and which contains no fissionable or fertile material. The elements are grouped together at fixed distances from each other in a coolant flow channel or region as a fuel assembly, and sufficient fuel assemblies are combined to form the nuclear reactor core capable of the self-sustained fission reaction referred to above. The core is enclosed within a reactor vessel through which a coolant is circulated.

Some nuclear fuels, which include either elemental forms or various chemical compounds of the fissile isotopes referred to above, are highly desirable from chemical and physical stability standpoints, but have some disadvantageous heat transfer properties. For example, such compounds as the oxides, silicides, carbides, and nitrides of such metals as uranium and plutonium have, in most instances, relatively low thermal conductivities. With such a property, relatively high temperature gradients are required to drive the heat liberated in the fuel element out to and through its heat transfer surface into the ambient coolant. For economic reasons, high specific powers and high heat transfer rates are required; hence high internal fuel temperatures are associated with such fuels.

By way of specific example, a uranium dioxide ($UO_2$) fuel element of circular cross-section and about 0.5 inch in diameter, generating power at the rate of 50 million B.t.u./hr./ft.$^3$ fuel and transferring heat at a rate of 500,000 B.t.u./hr./ft.$^2$ fuel surface will have an internal temperature differential of about 3000° F. existing across the 0.25 inch radius of the rod. Attempts to increase the power generation rate in such a fuel rod will increase the internal fuel temperature easily up into the region of 5000° F. which is the approximate melting point of $UO_2$. It is felt by many that adverse effects upon the fuel rod will result from such internal melting.

Similar problems exist in nuclear fuels of virtually any kind if they have relatively low thermal conductivities and are desirably operated at high specific powers.

It is accordingly an object of this invention to overcome these thermal conductivity and temperature differential problems in an improved solid or semi-solid nuclear fuel element.

Another object of this invention is to provide a nuclear fuel element which, although having generally a flat or curved plate form, or even in tubular form, contains a plurality of short solid or semi-solid rods or geometric prisms of relatively short equivalent diameter.

A more specific object is to provide an improved solid or semi-solid nuclear fuel element in which the nuclear fuel material is enclosed in a plurality of relatively elongated cells surrounded by higher conductivity metal and from which at least a substantial part of the heat flows from the fuel in a direction transverse or perpendicular to the plane of the element surface to the outer heat transfer surface.

Another specific object of this invention is to provide a nuclear fuel element of the curved or flat plate type or tubular type and in which the nuclear fuel is contained in relatively small individual cells capable of resisting pressure generated therein by accumulation of fission product gases.

It is further an object of this invention to provide a method for producing the improved fuel elements in this invention.

Other objects and advantages of the present invention will become apparent to those skilled in the art as the description and illustration thereof proceed.

Briefly, the present invention comprises a flat or curved plate or tubular type nuclear fuel element which consists essentially of three layers of metal or other highly conductive material joined together in a "sandwich" form, including a center ply or "meat" layer. The outer two layers are imperforate layers of cladding. The center ply is a layer provided with a plurality of closely spaced perforations of small minimum width relative to the length of the cell measured perpendicular or normal to the surface of the fuel element at that point. The geometric cross-section of the perforation may be circular, eliptical, or polygonal, and either regular or irregular. These perforations are filled with nuclear fuel, either in solid or semi-solid form, the fuel filling the cell formed by the perforation and thus having the geometric shape of a rod or prism. The ratio of the length to the minimum width of the prism is at least 1.0 and preferably is between about 1.5 and 5.0. It should be understood that the length of this prism is measured normal or perpendicular to the fuel element surface and is the same as the thickness of the center or "meat" ply of the fuel. The rolling of this sandwich to produce the finished fuel element elongates the cells in one direction only, the ratio of length (normal to the element surface) to the minimum width of the cell measured parallel to the external surface of the fuel element, remains within the limits stated. Preferably, the minimum width of the fuel cell is less than about 0.25 inch and highly desirable embodiments of this invention utilize cells having equivalent widths of 0.125 inch or less.

Fuel elements embodying this invention and provided with fuel-filled cells whose relative length to equivalent minimum width ratios and whose minimum widths meet the limitations discussed above, avoid the high fuel temperatures referred to previously since they are capable of transferring a substantial portion of the heat generated therein laterally from the fuel cell in a direction parallel to the surface of the fuel plate into the adjacent metal of the central ply and then in a direction perpendicular to the surface of the fuel element through the metal through the external heat transfer surface into ambient coolant.

The present invention will be more readily understood by reference to the accompanying drawings in which:

FIGURE 1 is a cross-section view of a typical flat plate type fuel element;

FIGURE 2 is an enlarged cross-section view of a typical joint between the edge of a fuel plate and the fuel element side plate;

FIGURE 3 is a cross-section view of a fuel cell in the fuel plate of this invention indicating the heat transfer paths therethrough;

FIGURES 4a through 4e indicate the sequence of operations in one method for producing this fuel element;

FIGURES 5a through 5e illustrate the sequence of operations in a modified method for producing the fuel element of this invention;

FIGURES 6 through 9 illustrate typical patterns of the perforations in the center or "meat" ply of this fuel element prior to rolling the three-ply sandwich and which provides the fuel cells referred to above;

FIGURE 10 illustrates the appearance of the pattern of FIGURE 8 after the rolling procedure;

FIGURE 11 shows a cross-section view of a tubular fuel element embodying this invention;

FIGURE 12, including parts 12a, 12b, and 12c, indicate the sequence of operations in the fabrication of a flat plate having prestressed clad layers; and FIGURE 13, including parts 13a, 13b, and 13c, indicate the analogous operations in fabricating a curved fuel plate having prestressed clad layers.

Referring now more particularly to FIGURE 1, a cross-section view of a typical flat plate type fuel element is shown. A plurality of parallel fuel plates 10 are arranged side by side and integrally connected at their edges to side plates 12 and 14 to produce a rigid integral structure. Open channels 16 remain between each pair of adjacent fuel plates and through which a coolant is circulated for the removal of generated heat.

FIGURE 1 is illustrative of flat fuel plates. These plates may be curved in the same or similar manner as shown in U.S. Patent No. 2,831,806 which illustrates in FIGURES 8 through 10 a curved plate type fuel element for a nuclear reactor. Also illustrated here is the construction of a nuclear reactor including a reactor core made up of sufficient number of such plate type fuel elements so as to permit the maintenance of a self-sustaining fission reaction.

In FIGURE 2 is shown an enlargement of the intersection of side plate 12 with the edge of a fuel plate 10. Fuel plate 10 consists of outer layers 18 of metal cladding and a central ply 20 containing a plurality of fuel cells 22 according to this invention. The fuel plate is welded or brazed at 23 to the side plate, or is otherwise attached.

In FIGURE 3 an enlarged cross-section view shows two of the cells 22 in the central ply 20. The equivalent minimum diameter or width D of each fuel cell 22 is indicated to be somewhat less than the length L of each fuel cell. The $L/D$ ratio is thus between about 1.0 and 5.0 in this example. The fuel cells comprise small shapes of fuel elongated in one direction due to rolling and capable of transferring the heat generated in the central regions of the fuel from the ends of cells 22 in the direction of arrow 26 and transversely from ahe cell into the adjacent metal of the central ply and then through the central and the cladding plies as indicated by arrows 28. In ahis manner internal temperatures are greatly reduced and the temperature differentials which are normally on the order of about 3000° F. for a conventional fuel element containing UO₂ are reduced to the order of 500° F. in a UO₂ fuel element embodying the principles of this invention and operating at the equivalent power generation rate.

Referring now to FIGURES 4a through 4e, a sequence of operations is illustrated which will be described in connection with the fabricaaion of a fuel element of aluminum and containing enriched uranium dioxide as the active fuel. First a plate 30 about 0.25 inch in thickness and about 2.0 inches in width is selected as shown in 4a. Then a perforated plate 32 is placed immediately adjacent to plate 30 as in 4b. This plate includes perforations 34 of about 0.035 inch diameter which become the fuel cells of this invention. Next the cells 34 are filled with uranium dioxide powder and compacted to the maximum density possible by such techniques as vibration, compression by means of special dies which mate with the perforated plate, or other techniques known to those skilled in the art. Next the second cladding layer 36 is placed adjacent to the perforated fuel-containing layer 34 as in 4d. The three-ply sandwich resulting is then cold rolled to the final desired plate thickness, and ahe edges are trimmed or sheared to produce the fuel plate 38 shown in FIGURE 4e. The final dimentions of a typical fuel plate embodying this invention are length 36 inches, width 3.50 inches, total thickness 0.120 inch with cells of approximately 0.060 inch length normal to the plate surface and 0.030 inch minimum diameter or width in the direction across the fuel plate and elongated to as much as 0.50 inch along the fuel plate in the rolling direction. The $L/D$ ratio here is 2.0. The resulting density of ahe UO₂ fuel is between 90 and 95 percent of theoretical. If other typical structural or cladding materials are used instead of aluminum, including such materials as nickel, stainless steel, zirconium, and various alloys of these materials, the rolling conditions are changed to meet the individual requirements of the various metals. Hot rolling as well as cold rolling is contemplated in this invention.

Referring now to FIGURES 5a through 5e, the sequence of operations in a modified method for production of fuel embodying this invention is shown. In FIGURE 5a a metal plate 40 is selected, and in FIGURE 5b a perforated metal layer 42 is superimposed. These two layers are then given a preliminary rolling to reduce the thickness, increase the length, and to bond the two layers together closing the lower ends of the individual fuel cells 44 as shown in FIGURE 5c. Then the cells 44 are filled with fuel such as UO₂ powder and compacted as indicated in FIGURE 5d. Finally, a second clad layer 46, of thickness substantially the same as the reduced thickness of first clad layer 40, is placed adjacent the filled perforated layer 42 as shown in FIGURE 5e. These three layers are then finally rolled to bond layers 42 and 46 together and to reduce the thickness, increase the length further, and compact the fuel powder. The edges are sheared to produce a finished fuel plate substantially as indicated in FIGURE 4e.

In FIGURES 6 through 9, a series of typical patterns of the perforations contained in the center or fuel ply of fuel elements embodying this invention is shown. These patterns are typical of those existing prior to rolling the three-ply sandwich.

In FIGURE 6 a fuel plate 50 is provided with square perforations 52 and as much as about 80 percent of the metal may be removed in such a configuration.

In FIGURE 7 a fuel plate 54 is provided with a square pattern of circular perforations 56 and as much as about 65 percent of the metal may be removed in such a configuration.

In FIGURE 8 a fuel plate 58 is shown with a triangular pattern of circular holes 60 and as much as 75 percent of the metal may be removed with this configuration.

In FIGURE 9 a fuel plate 62 is shown provided with a honey-comb configuration of hexagonal perforations 64 and approximately 75 percent open area may be provided in this configuration.

In FIGURE 10 a fragmentary view of perforated plate 58a having elongated cells 60a is shown. This corresponds to the plate 58 and cells 60 shown in FIGURE 8 after the rolling operation. The minimum "diameter" or width D is shown taken transverse to the rolling or elongated directions.

In FIGURE 11 is shown a transverse cross-section view of a tubular fuel element embodying this invention. This element consists of central fuel-containing ply 70, provided with fuel cells 72, and inner and outer plies of clad 74 and 76. This fuel element may be produced by extrusion of the three layers of material, by rolling a plate embodying this invention into tubular form and welding the seam, and by other means.

The various perforated plates used in the fuel element of this invention may be produced by various known techniques, probably the most economic one being merely to punch the plate with appropriate dies to produce perforations. Other procedures will occur to those skilled in the art of metal fabrication techniques.

Obviously from the preceding description, other procedures and methods for securing the three layers of the fuel element of this invention together may be employed. One of these involves simply welding or brazing the edges of the three plies together to produce an integral fluid-tight assembly. A modified form of this procedure which enhances the ability of the finished structure to resist development of internal gas pressure is illustrated in FIGURES 12a, 12b, and 12c. This involves the use of flat perforated fuel-containing plate 80 between a pair of initially curved cladding plates 82 and 84 which are concave inwardly as shown in FIGURE 12a. These cladding plates are subsequently deformed between suitable dies 85 and 87 into registry with fuel-containing plate 80 across their entire surface 86 and 88 without exceeding the elastic limit of the material to produce a flat three-ply sandwich as shown in FIGURE 12b. The adjacent edges 90, 92, and 94 of the three plates are then welded or brazed together at 96 and 98 as shown in FIGURE 12c. This prestresses the outer clad layers 82 and 84 so that they each apply pressure inwardly against the central perforated fuel plate 80 and thus resist any gas pressure in the fuel cells 100.

This same procedure involving prestressing the cladding plates and welding the edges of the three plies may be applied in the production of the curved type of fuel plate as illustrated in FIGURES 13a, 13b and 13c. This involves the use of a center perforated fuel-containing layer 102 having substantially the same curvature as that desired in the finished fuel plate. This plate 102 is then enclosed between an inner clad layer 104, having a shorter radius of curvature, and an outer clad layer 106, having greater radius of curvature, as shown in FIGURE 13a. These three layers are then pressed together to the desired curvature between suitable dies 108 and 110 as shown in FIGURE 13b, thereby stressing the clad layers without exceeding the elastic limit, and then welding the adjacent edges 112, 114, and 116 of all three plies together as shown at 118 and 120 in FIGURE 13c.

In order to secure the greatest effective fuel density in the fuel elements of this invention, it is desirable to use perforated plies having the greatest open area possible. Desirably, this open area amounts to 65 percent or more of the nominal surface area of the center layer, and by spacing the individual perforations as closely as possible to one another as much as 80 percent open area may be realized. This produces a finished fuel in which the active nuclear fuel volume is about 80 percent of the volume of the center ply and about 50 percent of the volume of the whole fuel plate.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A method for producing a nuclear reactor fuel plate having prestressed clad layers to resist internal pressure effects which comprises positioning an inner perforated layer, containing nuclear fuel in the perforation thereof, between a pair of external clad layers each having a different radius of curvature than that of said perforated layer, and then pressing and bonding at least the edges of said layers together whereby at least said external layers are deformed within the elastic limit thereof into a different curvature and into registry across their entire adjacent surfaces with said perforated layer so that each external layer applies a force inwardly against the surfaces of said perforated plate.

2. A method according to claim 1 wherein said nuclear reactor fuel plate is substantially flat.

3. A method according to claim 1 wherein said nuclear reactor fuel plate is substantially curved.

4. A nuclear reactor fuel element having three layers joined together in a sandwich including two outer imperforate layers of cladding and an inner layer having a plurality of nuclear fuel-filled cells, said cells having a minimum width less than 0.25 inch and small relative to the length of said cell measured perpendicular to the surface of of said fuel element, said fuel element thus being adapted to transfer a susbtantial portion of heat generated in each fuel-filled cell laterally therefrom into the inner layer and then in a direction generally perpendicular to said surface through said imperforate layers, and adapted to reduce substantially the internal temperatures in said cell at a given power generation rate, said outer layers of cladding being stressed within the elastic limit during manufacture of said nuclear reactor fuel element to apply pressure inwardly against said inner layer to resist gas pressure generated within said fuel filled cells.

5. A nuclear reactor fuel element having an inner metal layer provided with a plurality of perforations forming cells, a plurality of bodies of nuclear fuel filling said cells, said cells each having a width less than 0.125 inch and an $L/D$ ratio of between about 1.0 and 5.0, wherein L is the length of the cell measured perpendicular to the external surface of the fuel element and D is the minimum width of the cell measured parallel to said surface, and a pair of outer imperforate metal clad layers bonded to said inner layer, said fuel element thus being adapted to transfer a substantial portion of heat generated in each fuel-filled cell laterally therefrom into said inner metal layer and then in a direction generally perpendicular to said surface through said imperforate layer, and adapted to reduce substantially internal temperatures in said cell at a given power generation rate, said outer metal clad layers being stressed within the elastic limit during manufacture of said nuclear reactor fuel element to apply pressure inwardly against said inner metal layer to resist gas pressure generated in said cells.

6. A nuclear reactor fuel element having a pair of external metal clad layers, and a central metal fuel-containing layer, said fuel-containing layer having a plurality of sealed nuclear fuel-filled cells, each of said cells being elongated in one direction and having a minimum width less than about 0.125 inch and having a ratio of length, measured perpendicular to the fuel element surface, to minimum width, measured in a direction parallel to said surface, of between about 1.0 and about 5.0, to permit transfer of a susbtantial portion of heat generated by the fuel in each cell first laterally from the cell in a direction generally parallel to the fuel element surface into the central metal layer containing said cells and then through the metal of said layer in a direction generally perpendicular to the element surface through said surface into ambient coolant, said external metal clad layers being stressed within the elastic limit during manufacture of said nuclear reactor fuel element to apply pressure inwardly against said central metal fuel-containing layer to resist gas pressure generated within said sealed cells.

References Cited in the file of this patent

UNITED STATES PATENTS

| | | |
|---|---|---|
| 2,820,751 | Saller | Jan. 21, 1958 |
| 2,872,388 | Fahnoe et al. | Feb. 3, 1959 |
| 2,894,893 | Carney | July 14, 1959 |
| 2,996,443 | Schaner | Aug. 15, 1961 |

OTHER REFERENCES

WAPD–MRP–67, PWR Report for Feb. 24, to Apr. 23, 1957, pages 42–43. (Copy in Library.) Available from OTS, Dept. of Comm., Washington 25, D.C., @ 45¢.

WAPD–MRP–68, PWR Report for Apr. 24 to June 23, 1957, pp. 79–80. Copy available same as WAPD–MRP–67.

International Conference on the Peaceful Uses of Atomic Energy (1955), vol. 9, pp. 203–207. (Copy in Library.)

TID–7559 (Part I), Fuel Elements Conference, May 16, 1958, pp. 133–155. (Copy in Div. 46.)